US012542699B2

(12) United States Patent
Neumann et al.

(10) Patent No.: US 12,542,699 B2
(45) Date of Patent: Feb. 3, 2026

(54) EFFICIENTLY TRANSFERABLE BIT SEQUENCE WITH LIMITED DISPARITY

(71) Applicant: INOVA SEMICONDUCTORS GMBH, Munich (DE)

(72) Inventors: Roland Neumann, Bad Toelz (DE); Fabian Kluge, Perasdorf (DE)

(73) Assignee: INOVA SEMICONDUCTORS GMBH, Munich (DE)

( * ) Notice: Subject to any disclaimer, the term of this patent is extended or adjusted under 35 U.S.C. 154(b) by 6 days.

(21) Appl. No.: 18/784,445

(22) Filed: Jul. 25, 2024

(65) Prior Publication Data

US 2024/0380643 A1    Nov. 14, 2024

Related U.S. Application Data

(63) Continuation of application No. PCT/EP2023/076110, filed on Sep. 21, 2023.

(30) Foreign Application Priority Data

Sep. 27, 2022    (EP) .................................... 22198217

(51) Int. Cl.
*H04L 25/49* (2006.01)
*H04L 7/06* (2006.01)
(52) U.S. Cl.
CPC ............ *H04L 25/4908* (2013.01); *H04L 7/06* (2013.01); *H04L 25/4915* (2013.01)
(58) Field of Classification Search
CPC .... H04L 25/4908; H04L 7/06; H04L 25/4915
See application file for complete search history.

(56) References Cited

U.S. PATENT DOCUMENTS

| 5,612,694 A * | 3/1997 | Jedwab ................... H04L 25/14 |
|---|---|---|
| | | 341/94 |
| 6,691,275 B1 | 2/2004 | Jaeckel |
| 2007/0162807 A1* | 7/2007 | Kurayama ....... G01R 31/31813 |
| | | 714/738 |

FOREIGN PATENT DOCUMENTS

EP    3323219 A1    5/2018

OTHER PUBLICATIONS

J. Boye, A. Mizes and L. Funk, "11b/14b Encoding—A Fault Tolerant, DC-Balanced Line Code for AC-Coupled Channel Link Transceivers," 2019 IEEE Aerospace Conference, Big Sky, MT, USA, 2019, pp. 1-11 (Year: 2019).*
International Search Report issued by the European Patent Office for International Patent Application No. PCT/ EP2023/076110, dated Oct. 13, 2023, with English translation.
Boye et al. "11b/14b Encoding—A Fault Tolerant, DC-Balanced Line Code for AC-Coupled Channel Link Transceivers", IEEE, 2019, pp. 1-11.

* cited by examiner

*Primary Examiner* — Sung S Ahn
(74) *Attorney, Agent, or Firm* — Myers Wolin, LLC

(57) ABSTRACT

A method is provided for generating an efficiently transferable bit sequence with a limited disparity and a limited run length. A correspondingly configured system arrangement as well as to a computer program product and a memory-readable medium with control commands which execute the method are provided as well.

21 Claims, 9 Drawing Sheets

| data nr | data | symbol | symbol nr | | sym.pol |
|---|---|---|---|---|---|
| 0 | 000000 | 00101011 | 0 | 0 | 0 0000 |
| 1 | 000001 | 00111001 | 1 | 0 | 0 0000 |
| 2 | 000010 | 00101101 | 2 | 0 | 0 0000 |
| 3 | 000011 | 00101110 | 3 | 0 | 0 0000 |
| 4 | 000100 | 00110110 | 4 | 0 | 0 0000 |
| 5 | 000101 | 00011110 | 5 | 0 | 0 0000 |
| 6 | 000110 | 01011100 | 6 | 0 | 0 0000 |
| 7 | 000111 | 01011010 | 7 | 0 | 0 0000 |
| 8 | 001000 | 00111010 | 8 | 0 | 0 0000 |
| 9 | 001001 | 00011011 | 9 | 0 | 0 0000 |
| 10 | 001010 | 01011001 | 10 | 0 | 0 0000 |
| 11 | 001011 | 01010011 | 11 | 0 | 0 0000 |
| 12 | 001100 | 01010110 | 12 | 0 | 0 0000 |
| 13 | 001101 | 11010100 | 13 | 0 | 0 0000 |
| 14 | 001110 | 10010101 | 14 | 0 | 0 0000 |
| 15 | 001111 | 10010011 | 15 | 0 | 0 0000 |
| 16 | 010000 | 10110010 | 16 | 0 | 0 0000 |
| 17 | 010001 | 00110011 | 17 | 0 | 0 0000 |
| 18 | 010010 | 00010111 | 18 | 0 | 0 0000 |
| 19 | 010011 | 00110101 | 19 | 0 | 0 0000 |
| 20 | 010100 | 10110100 | 20 | 0 | 0 0000 |
| 21 | 010101 | 10111000 | 21 | 0 | 0 0000 |
| 22 | 010110 | 10011010 | 22 | 0 | 0 0000 |
| 23 | 010111 | 10011100 | 23 | 0 | 0 0000 |
| 24 | 011000 | 10001110 | 24 | 0 | 0 0000 |
| 25 | 011001 | 10010110 | 25 | 0 | 0 0000 |
| 26 | 011010 | 11010010 | 26 | 0 | 0 0000 |
| 27 | 011011 | 11100010 | 27 | 0 | 0 0000 |
| 28 | 011100 | 11100100 | 28 | 0 | 0 0000 |
| 29 | 011101 | 11001100 | 29 | 0 | 0 0000 |
| 30 | 011110 | 11101000 | 30 | 0 | 0 0000 |

Fig. 6A

| data nr | data | symbol | symbol nr | sym.pol | |
|---|---|---|---|---|---|
| 0 | 0000000 | 00010101 | 30 | -2 | 1 0010 |
| 1 | 0000001 | 00011101 | 31 | 0 | 0 0000 |
| 2 | 0000010 | 01001101 | 32 | 0 | 0 0000 |
| 3 | 0000011 | 01101101 | 33 | 2 | 0 0010 |
| 4 | 0000100 | 01011101 | 34 | 2 | 0 0010 |
| 5 | 0000101 | 01011001 | 35 | 0 | 0 0000 |
| 6 | 0000110 | 11011001 | 36 | 2 | 0 0010 |
| 7 | 0000111 | 10011001 | 37 | 0 | 0 0000 |
| 8 | 0001000 | 10010011 | 38 | 0 | 0 0000 |
| 9 | 0001001 | 10010010 | 39 | -2 | 1 0010 |
| 10 | 0001010 | 10010110 | 40 | 0 | 0 0000 |
| 11 | 0001011 | 11010110 | 41 | 2 | 0 0010 |
| 12 | 0001100 | 10010111 | 42 | 2 | 0 0010 |
| 13 | 0001101 | 00110111 | 43 | 2 | 0 0010 |
| 14 | 0001110 | 00100111 | 44 | 0 | 0 0000 |
| 15 | 0001111 | 00100011 | 45 | -2 | 1 0010 |
| 16 | 0010000 | 01110011 | 46 | 2 | 0 0010 |
| 17 | 0010001 | 01110010 | 47 | 0 | 0 0000 |
| 18 | 0010010 | 01010011 | 48 | 0 | 0 0000 |
| 19 | 0010011 | 01100111 | 49 | 2 | 0 0010 |
| 20 | 0010100 | 01100101 | 50 | 0 | 0 0000 |
| 21 | 0010101 | 01101011 | 51 | 2 | 0 0010 |
| 22 | 0010110 | 00101011 | 52 | 0 | 0 0000 |
| 23 | 0010111 | 10001001 | 53 | -2 | 1 0010 |
| 24 | 0011000 | 11001001 | 54 | 0 | 0 0000 |
| 25 | 0011001 | 11010001 | 55 | 0 | 0 0000 |
| 26 | 0011010 | 01010001 | 56 | -2 | 1 0010 |
| 27 | 0011011 | 10010001 | 57 | -2 | 1 0010 |
| 28 | 0011100 | 00011001 | 58 | -2 | 1 0010 |
| 29 | 0011101 | 00011010 | 59 | -2 | 1 0010 |
| 30 | 0011110 | 10111010 | 60 | 2 | 0 0010 |

Fig. 6B

| data nr | data | symbol | symbol nr | sym.pol | |
|---|---|---|---|---|---|
| 0 | 0000000000 | 0011111110001 | 11 | 2 | 0 0010 |
| 1 | 0000000001 | 0011111110100 | 12 | 2 | 0 0010 |
| 2 | 0000000010 | 1001111110100 | 13 | 2 | 0 0010 |
| 3 | 0000000011 | 1001101101110 | 14 | 2 | 0 0010 |
| 4 | 0000000100 | 1001100101110 | 15 | 0 | 0 0000 |
| 5 | 0000000101 | 1001000101110 | 16 | -2 | 1 0010 |
| 6 | 0000000110 | 1001100100110 | 17 | -2 | 1 0010 |
| 7 | 0000000111 | 1100110100110 | 18 | 0 | 0 0000 |
| 8 | 0000001000 | 0101110100110 | 19 | 0 | 0 0000 |
| 9 | 0000001001 | 0101010100001 | 20 | -2 | 1 0010 |
| 10 | 0000001010 | 0101010101101 | 21 | 0 | 0 0000 |
| 11 | 0000001011 | 1110000000111 | 22 | 0 | 0 0000 |
| 12 | 0000001100 | 1110001000110 | 23 | 0 | 0 0000 |
| 13 | 0000001101 | 0110101000110 | 24 | 0 | 0 0000 |
| 14 | 0000001110 | 0111101000110 | 25 | 2 | 0 0010 |
| 15 | 0000001111 | 0111101000100 | 26 | 0 | 0 0000 |
| 16 | 0000010000 | 0111101010000 | 27 | 0 | 0 0000 |
| 17 | 0000010001 | 1110101110000 | 28 | 2 | 0 0010 |
| 18 | 0000010010 | 1110100110000 | 29 | 0 | 0 0000 |
| 19 | 0000010011 | 1011000110000 | 30 | -2 | 1 0010 |
| 20 | 0000010100 | 1011001011100 | 31 | 2 | 0 0010 |
| 21 | 0000010101 | 1001001011100 | 32 | 0 | 0 0000 |
| 22 | 0000010110 | 1000001011100 | 33 | -2 | 1 0010 |
| 23 | 0000010111 | 1000101011100 | 34 | 0 | 0 0000 |
| 24 | 0000011000 | 1000111001000 | 35 | -2 | 1 0010 |
| 25 | 0000011001 | 1100101001011 | 36 | 0 | 0 0000 |
| 26 | 0000011010 | 0100101001011 | 37 | -2 | 1 0010 |
| 27 | 0000011011 | 0100011001110 | 38 | 0 | 0 0000 |
| 28 | 0000011100 | 0110000000111 | 39 | -2 | 1 0010 |
| 29 | 0000011101 | 0110010001011 | 40 | -2 | 1 0010 |
| 30 | 0000011110 | 0110110001011 | 41 | 0 | 0 0000 |

Fig. 6C

| data nr | data | symbol | symbol nr | sym.pol |
|---|---|---|---|---|
| 0 | 00000000000 | 1101110100101 | 19 | 3 | 0 0011 |
| 1 | 00000000001 | 1011110100101 | 20 | 3 | 0 0011 |
| 2 | 00000000010 | 1110111100101 | 21 | 5 | 0 0101 |
| 3 | 00000000011 | 1110111100111 | 22 | 7 | 0 0111 |
| 4 | 00000000100 | 0110110101111 | 23 | 5 | 0 0101 |
| 5 | 00000000101 | 0011110101111 | 24 | 5 | 0 0101 |
| 6 | 00000000110 | 0111110000111 | 25 | 3 | 0 0011 |
| 7 | 00000000111 | 0111110010111 | 26 | 5 | 0 0101 |
| 8 | 00000001000 | 0111100010111 | 27 | 3 | 0 0011 |
| 9 | 00000001001 | 0111000011111 | 28 | 3 | 0 0011 |
| 10 | 00000001010 | 0110001011111 | 29 | 3 | 0 0011 |
| 11 | 00000001011 | 0110111001011 | 30 | 3 | 0 0011 |
| 12 | 00000001100 | 1110111000011 | 31 | 3 | 0 0011 |
| 13 | 00000001101 | 0100111010111 | 32 | 3 | 0 0011 |
| 14 | 00000001110 | 0101110010111 | 33 | 3 | 0 0011 |
| 15 | 00000001111 | 1011110010111 | 34 | 5 | 0 0101 |
| 16 | 00000010000 | 1011101010111 | 35 | 5 | 0 0101 |
| 17 | 00000010001 | 1011101010011 | 36 | 3 | 0 0011 |
| 18 | 00000010010 | 1011111010011 | 37 | 5 | 0 0101 |
| 19 | 00000010011 | 1110110000111 | 38 | 3 | 0 0011 |
| 20 | 00000010100 | 1110110100011 | 39 | 3 | 0 0011 |
| 21 | 00000010101 | 1010111110011 | 40 | 5 | 0 0101 |
| 22 | 00000010110 | 1000111110011 | 41 | 3 | 0 0011 |
| 23 | 00000010111 | 1001111100011 | 42 | 3 | 0 0011 |
| 24 | 00000011000 | 1001110100111 | 43 | 3 | 0 0011 |
| 25 | 00000011001 | 1011100100111 | 44 | 3 | 0 0011 |
| 26 | 00000011010 | 1011100110110 | 45 | 3 | 0 0011 |
| 27 | 00000011011 | 1000101111110 | 46 | 3 | 0 0011 |
| 28 | 00000011100 | 1100100111110 | 47 | 3 | 0 0011 |
| 29 | 00000011101 | 1100101110110 | 48 | 3 | 0 0011 |
| 30 | 00000011110 | 1100011010111 | 49 | 3 | 0 0011 |

Fig. 6D

EFFICIENTLY TRANSFERABLE BIT SEQUENCE WITH LIMITED DISPARITY

CROSS REFERENCE TO RELATED APPLICATIONS

This application is a continuation of International Application No. PCT/EP2023/076110, filed Sep. 21, 2023, which takes priority from European Patent Application No. 22198217.6, filed Sep. 27, 2022, the entire contents of each of which are incorporated by reference herein.

FIELD OF THE INVENTION

The present invention relates to a method for generating an efficiently transferable bit sequence with a limited disparity and a limited run length. The proposed method allows data to be transmitted particularly efficiently via a transmission channel.

BACKGROUND

Optimised disparity is a quality feature for the transferability of data. A disadvantageous disparity can lead to data not being transmitted properly via a data channel, as it cannot be interpreted properly by the recipient. Another quality feature is data efficiency with regard to the ratio of transmitted user data and a further data volume that is not directly related to the content of the user data. This includes so-called header data. The proposed method makes it possible to generate data streams that can be read out particularly efficiently and are also very efficient in terms of overhead data. This minimises the so-called overhead of the user data, which in turn creates a particularly efficient process. The unambiguous interpretability on the receiver side also ensures that data does not have to be transmitted repeatedly, but can instead be read out on the receiver side with a high degree of error tolerance. In addition, the proposed method is particularly efficient, as data segments can be converted into sub-symbols or symbols made up of sub-symbols in parallel, and only units that are technically simple to produce are required for this parallel design. Thus, the efficiency gain here also relates to the hardware or runtime to be used. The disclosure is also directed to a correspondingly configured system arrangement as well as to a computer program product and a memory-readable medium with control commands which execute the method.

Boye Jeffrey et al: "11b/14b Encoding—A Fault Tolerant, DC-Balanced Line Code for AC-Coupled Channel Link Transceivers", 2019 IEEE Aerospace Conference, IEEE, 2 Mar. 2019, demonstrates a fault-tolerant, DC-balanced line coding scheme for use with AC-coupled channel link transceivers that have a 7-bit frame alignment as opposed to a more typical 8-bit alignment.

U.S. Pat. No. 6,691,275 B1 discloses a method and apparatus for encoding input data at a faster rate. These enable error detection, clock recovery and reduction of spectral components near DC and are capable of encoding data while embedding error detection information.

EP 3323219 A1 shows a method which makes it possible to read out an analogue data stream via a data line in a particularly error-proof manner. Among other things, the amplitude of the signal is monitored and, particularly preferably, the signal is measured at the point at which the amplitude is at its maximum. This converts an analogue data stream into a digital data set and the maximum amplitude ensures that the threshold value between 0 and 1 on the line is reliably undercut or exceeded.

Various coding methods and data transmission methods are known from the state of the art, but all of them relate to application scenarios that can only be used in a disadvantageous way in an automobile. For example, the state of the art often assumes that high computing power is available and that there are no high real-time requirements. In addition, the state of the art often assumes that the weight or reliability of the components to be used plays a subordinate role. The state of the art often refers to conventional computer networks, where reliability and low technical complexity are less important.

Based on this state of the art, there is a need to create a method or a system arrangement that enables data to be processed as quickly as possible due to the safety requirements in the automobile and also requires little technical effort and minimises the error rate during transmission, as retransmission is not possible if an error is detected. The low technical complexity should consist of installing components that are as simple as possible, have a low weight and can also be manufactured efficiently in large quantities. Known methods and system arrangements from computer network technology cannot typically be used here, as weight savings and real-time running behaviour are not decisive for a stand-alone PC or server. Although the heat to be dissipated generally poses a challenge for computer arrangements, energy efficiency in an automobile is of even greater importance, as in electromobility, for example, power consumption even influences the range of the vehicle.

Further prior art relates to the transmission of data in a serial data stream. For example, the state of the art provides for extensive description data to be transmitted with the user data, indicating where the user data is located and how it is to be interpreted. In addition, it is known in the state of the art to discard individual data packets if they are not transmitted correctly. Furthermore, it is known in the state of the art to resend data packets if they do not arrive at a sender on time or in an unexpected format.

When transmitting data serially, it is necessary for the number of ones and zeros in the serial data stream to be as equal as possible. This is called disparity. A disparity of zero on average and also over a short period of time is desirable to avoid baseline drift during transmission. The baseline drift (DC voltage fluctuation) of the serial signal leads to bit errors. In extreme cases, transmission is not possible.

A minimum number of 0→1 or 1→0 transitions is required to be able to reliably recover the serial bits in the serial data stream on the receiving end without the need to transmit a clock. This means that the clock for recovering the serial data is generated locally at the receiver from the serial data stream. The so-called run length specifies how many identical bits (ones or zeros) can occur in succession without changing. A short run length is always desirable, as long run lengths no longer allow the clock to be reliably recovered from the serial data stream.

The task of the line code (in this case a block code) is now to generate a symbol with guaranteed disparity and guaranteed run length from any data words with any disparity and infinite run length. This leads to an overhead during transmission. This means that more bits (in the form of symbols) have to be transmitted than occur in the net data word to be transmitted. This means that the required transmission speed (bandwidth) must be greater than the data rate of the data to be transmitted. This in turn means that systems require higher error rates or more effort, power, etc. than would be necessary to transmit the raw data.

The state of the art either has a high overhead (8B10B) or the quality of the encoded signal in terms of disparity and run length is very poor, so that additional measures (complexity) such as scramblers are often necessary to improve the quality in terms of disparity or run length.

SUMMARY

Accordingly, one task of the present disclosure is to create a method that generates a bit sequence that can be transmitted particularly efficiently. In this context, efficient can refer to hardware efficiency, efficient decryption on the receiver side, the lack of need for redundant data transmission due to signals that cannot be interpreted and/or to the ratio of user data to overhang data. Furthermore, according to the disclosure, it should be possible to create or use particularly efficient hardware that enables runtime optimisation through parallel processing. Furthermore, it is a task to provide a correspondingly equipped system arrangement, as well as a computer program product and a computer-readable storage medium with control commands which execute the method or operate the system arrangement.

The problem is addressed by various embodiments disclosed herein.

Accordingly, a method is proposed in an automobile for generating an efficiently transmittable bit sequence with a restricted disparity and a restricted run length, comprising providing an arbitrary bit sequence; segmenting the provided bit sequence into a predefined sequence of segments according to a respective predefined bit length; and encoding each segment into a respective sub-symbol using a respective encoding unit per segment from a plurality of encoding units, wherein a first subset of encoding units represents a sign of the bit sequence; and encoding each segment into a respective subsymbol, using a respective encoding unit per segment from a plurality of encoding units, wherein a first subset of encoding units actively controls a sign of the disparity of the subsymbol by inverting the disparity of the generated subsymbol to compensate for a disparity of a second subset of encoding units, wherein a juxtaposition of the subsymbols results in the efficiently transmittable bit sequence.

In a preparatory process step, it is possible to provide a potentially infinite bit stream that contains the arbitrary bit sequence. Depending on the application scenario, the data stream is already of any length and can in turn be divided into words or any bit sequence. This provides an output data stream with a bit sequence that is potentially of any length. However, this arbitrary length can be defined in a preparatory process step and can preferably be defined as 112 bits. As soon as the length or the bit length of the arbitrary bit sequence is defined, it is fixed in accordance with one aspect of the present invention. In this respect, an arbitrary length of the bit sequence in the sense of the present disclosure cannot be understood as arbitrary. Rather, the synonym of the arbitrary bit sequence according to the disclosure may be a bit sequence whose length can be freely selected in advance and/or whose content corresponds to the data to be transmitted or at least part of the data to be transmitted.

In a preparatory process step, it is therefore possible to provide an output data stream containing the arbitrary bit sequence. This arbitrary bit sequence is then read from the output data stream and provided in a first process step.

Typically, the output data stream or the output bit sequence can have so many bits that the process is carried out iteratively in such a way that several arbitrary bit sequences are generated from the output bit sequence, segmented, converted into sub-symbols, optimised with regard to disparity and then transmitted. This means that the output bit sequence can also be of any length and can ultimately be transmitted in several overall symbols.

The coding units are plural, whereby each segment, which in turn corresponds to a part of the arbitrary or freely selectable bit sequence, is assigned a coding unit. This then converts the segment into a sub-symbol, whereby the set of sub-symbols concatenated corresponds to the symbol or the overall symbol of the bit sequence to be transmitted efficiently. Thus, according to one aspect of the present invention, an encoding unit is located in a logical path of the processing chain or the structural arrangement between a segment and a partial symbol.

The proposed method is particularly efficient, as the transferable bit sequence has a particularly high level of user data compared to the state of the art. For example, it is possible to transmit 128 bits, which have 112 bits of user data. The proposed method is therefore already superior to the state of the art in this aspect. In addition, the creation of the transferable bit sequence is particularly efficient, as this can be carried out in parallel and coding units can be used for this purpose that are particularly simple in design. In this context, simple means, for example, that very few circuits need to be installed in the coding units. The coding units do not have to have extensive logic and can even be optimised for a certain number of bits. Accordingly, it is thus possible for the input and the output of the respective coding unit to be fixed with regard to the number of bits.

Due to the optimised disparity of the bit sequence to be transmitted, it is possible to avoid errors when interpreting on a serial channel. Efficiency therefore also refers to the fact that the bit sequence is particularly error-resistant and can therefore only be reliably transmitted once. Redundant transmission is avoided due to the high detectability, again due to the optimised disparity.

When transmitting data serially, it is advantageous to keep the number of ones and zeros in the serial data stream as equal as possible. This is generally referred to as disparity. For reliable clock recovery at the receiver, a run length restriction can be imposed on the generated channel sequence. This limits the maximum number of consecutive ones and zeros. The proposed method can therefore also be described as a method for efficient coding of a bit sequence. Accordingly, the disparity is optimised by cleverly setting partial disparities. This can be used particularly advantageously if the run length of the bit sequence is limited. The restricted disparity and the restricted run length can also relate to the arbitrary bit sequence provided. This means that it does not have to be the efficiently transferable bit sequence. Overall, the arbitrary bit sequence provided is efficiently transferable or a bit sequence to be transferred is generated or created from this bit sequence, which is then efficiently transferable.

In a preparatory process step, an arbitrary bit sequence encoding user data is provided. Problems can occur in this arbitrary bit sequence, for example if there is an unfavourable disparity. For example, too many zeros can lead to problems during transmission. This is to be avoided and therefore the arbitrary bit sequence is optimised in further process steps so that it can now be transmitted efficiently. The arbitrary bit sequence provided therefore represents any user data that is to be sent from a transmitter to a receiver via a serial data channel. The arbitrary bit sequence can, for example, be control data in an automobile.

According to the invention, the bit sequence provided is segmented into a predefined sequence of segments according to a predefined bit length. Thus, the input data stream, i.e. the arbitrary bit sequence, is divided according to a predefined procedure so that individual data segments are created. The segments therefore cumulatively result in the arbitrary bit sequence. The predefined bit length has the advantage that coding units can be optimised in the same way that the respective bit length is taken into account. This makes it possible to create particularly efficient circuits that are highly specialised. Defined bit lengths are mentioned below, but these are merely examples.

Each segment is coded into a sub-symbol using one coding unit per segment from a plurality of coding units. The coding itself takes place in one coding unit, which finds one segment at the input and then converts this segment into a partial symbol. The partial symbol is also a bit sequence. Overall, the arbitrary bit sequence is therefore divided into segments, these segments are each converted into a sub-symbol by a coding unit and the entirety of the sub-symbols results in the coding of the arbitrary bit sequence to be transmitted. Overall, it is advantageous that the number of segments corresponds to the number of coding units and thus to the number of partial symbols. It is therefore possible for each segment to have exactly one coding unit, which in turn generates exactly one partial symbol from the segment. The number of coding units describes all the coding units to be used, which corresponds to the number of segments. The number of segments is predefined, as a predefined bit length is specified. The method is therefore deterministic overall.

In order to achieve a favourable disparity overall, there is a first subset of coding units that actively controls the sign of the disparity of the sub-symbol by inverting the disparity of the generated sub-symbol to compensate for a disparity of a second subset of coding units. This therefore means that there are subsets of coding units that control the sign of the disparity or not. Coding units of the first subset control this sign and coding units of the second subset do not control it. Coding units of the first subset can therefore be described as active and coding units of the second subset as passive. Due to the different subsets or types of coding units, it is possible to connect the coding units in series in such a way that coding units of the first subset also favourably shape the overall disparity of the partial symbols from the coding units of the second subset.

According to the disclosure, therefore, coding units are used which are arbitrary with respect to the disparity of the subsymbol. A coding unit of the first subset can then be connected in parallel, which controls the sign of the disparity of the preceding coding unit and its own coding unit or its subsymbols depending on the disparity of the coding unit of the second subset. This means that a certain number of coding units of the second subset are used and then another certain number of coding units of the first subset are used. In this way, the types or subsets of the coding units change in such a way that the next coding unit connected in parallel adapts the disparity of the previous subsymbol(s) and/or its own subsymbol. In this way, it is avoided that non-controllable coding units are connected in parallel one after the other in such a way that an unfavourable disparity occurs. Each coding unit of the first subset thus corrects the sign of the previously parallel-connected coding units or their subsymbols. This parallel connection of coding units is described in more detail below with reference to FIG. 4.

In summary, it can therefore be concluded that coding units of the first subset optimise coding units of the second subset with regard to disparity. Optimising a disparity means that the disparity is 0. How the skilled person calculates disparities or sets them, for example by changing the sign, is sufficiently well known to the skilled person.

According to the proposed method, sub-symbols are therefore created which are optimised in their sequence with regard to disparity. As each segment is converted into a sub-symbol, the (overall) symbol to be transmitted can be generated by stringing together the sub-symbols. This can be transferred particularly efficiently or error-tolerantly, as the disparity or partial disparities are optimised. This results in a particularly favourable bit sequence to be transmitted.

According to one aspect of the present invention, the arbitrary bit sequence is unrestricted in its disparity and run length. This has the advantage that any amount of user data can be transmitted or can be converted into a bit sequence which is restricted in its disparity and restricted in its run length. This means that any bit sequence is encoded into a bit sequence to be transmitted, which is optimised in terms of its disparity and run length.

According to a further aspect of the present invention, the disparity of the second subset of coding units is not controllable. This has the advantage that any partial symbol can be generated using the coding units of the second subset, whereby particularly simple coding units are to be used. These can be designed to be particularly simple, as the generated partial symbol of this coding unit is not subject to any restrictions in terms of disparity or run length.

According to a further aspect of the present invention, the active control of the sign is performed in each case by means of conditional inversion of the subsymbol. This has the advantage that the corresponding subsymbol of the coding units of the first subset can be controlled in a simple manner. Only the disparity or individual bits of the partial symbol need to be inverted. The sign refers to the disparity of the partial symbol, which can be positive or negative.

According to a further aspect of the present invention, the conditional inversion takes place as a function of the disparity of an overall symbol, which is formed from all partial symbols. This has the advantage that not only partial symbols are optimised, but also the entire, i.e. the combined partial symbols, i.e. the overall symbol is optimised with respect to the disparity. This results in a particularly favourable overall symbol.

According to a further aspect of the present invention, the dependence is influenced in such a way that a magnitude value of the disparity is minimised. This has the advantage that the lowest possible disparity, preferably 0, is achieved. Disparities are thus linked with one another in such a way that the amount of the disparities is as low as possible or as low as possible.

According to a further aspect of the present invention, the absolute value is minimised in such a way that a positive total symbol disparity is counteracted by a negative parity of the sub-symbols. This has the advantage that the positive total symbol disparity is minimised or eliminated.

According to a further aspect of the present invention, the absolute value is minimised in such a way that a negative overall symbol disparity is counteracted by a positive parity of the sub-symbols. This has the advantage that the total symbol disparity is minimised or eliminated overall.

According to a further aspect of the present invention, active control takes place as a function of already transmitted total symbols, such that the disparity of all total symbols is minimised. This has the advantage that several total symbols are minimised with regard to their disparity or the disparity is eliminated and thus several sequences of total symbols are also optimised with regard to their transferability.

According to a further aspect of the present invention, coding units of the first subset encode segments of 11 bits to subsymbols of 13 bits. This has the advantage that 11 bits are encoded particularly efficiently and only an additional expenditure of 2 bits is incurred for this. This is particularly advantageous if a total symbol of 128 bits is to be created. In general, the specific values of the proposed technical teaching mentioned here were determined empirically and can be proven by the fact that only an additional effort of 128-112 bits, i.e. 14%, is necessary. Thus, the values listed here are proven to be advantageous for a transmission of 112 bits.

According to a further aspect of the present invention, coding units of the first subset have a disparity between +3 and +9, which are specifically inverted to −3 to −9 by inversion. This has the advantage that, for example, a disparity of +3 is cancelled with a disparity of −3, which is done analogously when adjusting the disparity of +9 with a disparity of −9. This in turn is particularly advantageous for an arbitrary bit sequence of 112 bits, which is to be coded as 128 bits.

According to a further aspect of the present invention, the run length in sub-symbols is a maximum of 7. This has the advantage that a maximum of 7 equal instances of zeros and ones are generated, which is particularly advantageous in the proposed scenario of 112 bits or 128 bits.

According to a further aspect of the present invention, the run length of the subsymbol for coding units of the first subset is a maximum of 5, starting from the most significant and/or the least significant bit. This has the advantage that a maximum of 5 identical bits can be present at the end or at the beginning of a subsymbol. This has also proved to be particularly advantageous in the scenario described.

According to a further aspect of the present invention, coding units of the second subset encode 11 bit segments on 12 bit sub-symbols or 7 bit segments on 8 bit sub-symbols or 6 bit segments on 8 bit sub-symbols. This has the advantage that this coding produces particularly advantageous values in the scenario of 112 bits to be transmitted in a symbol of 128 bits, which have a minimised overhang of only 14%.

According to a further aspect of the present invention, a disparity between −2 and +2 is generated for coding units of the second subset. This has the advantage that again particularly favourable disparities are generated.

According to a further aspect of the present invention, in the case of coding units of the second subset, the run length in the generated subsymbol is 6. This has the advantage that, again, particularly optimised subsymbols are generated.

According to a further aspect of the present invention, encoding units of the second subset generate partial symbols which have a maximum run length of 3 at the edge. This has the advantage that partial symbols which are created by the second subset of coding units have a maximum run length of 3 at the beginning or at the end, which is a particularly advantageous value.

According to a further aspect of the present invention, the coding units are addressed in parallel and one segment is coded into a sub-symbol in each case. This has the advantage that a segment is converted into exactly one sub-symbol with exactly one coding unit. The coding units can therefore be addressed in parallel, since segments are formed from the arbitrary bit sequence, which can be converted into partial symbols in parallel.

According to a further aspect of the present invention, the coding units are addressed in the sequence 21212221212, where a 1 stands for a coding unit of the first subset and a 2 for a coding unit of the second subset. This has the advantage that a non-actively controlled number of coding units is always followed by a single coding unit which can be actively controlled. It has been empirically determined that the proposed coding units result in a particularly favourable overall symbol.

According to a further aspect of the present invention, when a positive data stream with respect to the disparity and a negative data stream are applied, a multiplexer selects the data stream that contributes to minimising the overall disparity of the overall symbol. This has the advantage that a suitable data stream can be selected which has a sign that minimises or eliminates the disparity. If, for example, the disparity to be optimised is negative, a data stream with positive disparity is selected, which then minimises or compensates for this data stream with regard to its disparity.

One aspect of the present invention is to bundle several data streams (video, audio and data) in one transport frame and transmit them serially. The different data formats not only have different bandwidth requirements, but also different latency, reassembly sublayer and bit error rate requirements. In particular, the transmission of today's video data formats requires not only the transmission of pure video data and its frame information, but also the support of encryption methods such as HDCP. All of this requires many different data channels with a wide variety of requirements in terms of bandwidth, latency, reassembly sub-layer, etc. Added to this is the desire for far more complex network architectures than a simple transmitter/receiver architecture offers. Architectures with several repeaters, where data paths can begin and end, branches (Y) and the possibility of reintegrating data paths into a link are advantageous.

According to one aspect of the present invention, the technology follows the basic idea of consistently bundling services, but offers completely new possibilities with regard to network architectures and allows new approaches in the implementation of today's video interfaces. In addition, it can be used as a universal data transport layer, for example also for the transmission of Ethernet or camera data or any type of sensor data.

With a virtual path, all packets/cells take the same path, in contrast to IP, where a packet could reach its destination via a different route than previous and subsequent packets. Latency and reassembly sublayers over a virtual path are therefore constant.

Virtual paths also have the advantage that they can be used as multiplexing offshoots for different services (video, audio, Ethernet), as the properties of the virtual paths can be configured differently without the different virtual paths interfering with each other.

Virtual paths only consume bandwidth when data is actually being transferred.

The concept of virtual paths also makes it possible to realise complex and far-reaching diagnostic and network configuration functions at runtime with separate (virtual) data channels.

According to one aspect of the present invention, a virtual path layer is provided between the physical layer (serialiser and framer) and the various application data interfaces.

According to one aspect of the present invention, this is used to multiplex the various data paths and support more complex architectures with repeaters and branches. This is mainly done in the cell layer.

According to an aspect of the present invention, a further part of the virtual path layer is an application adaptation layer which performs the conversion of video (stream) or, for example, Ethernet (packet) data into the cells. This application adaptation layer also comprises the OAM functions for network diagnostics and management.

According to one aspect of the present invention, the technology can be the basis for transmitting a variety of data formats via a serial connection in the car (and elsewhere). It thus forms the basis for a new generation of devices.

The high serial bandwidths make it necessary to define architectures, cell formats and interfaces that enable flexible internal data bus widths in order to adapt the speed of the internal timing system to the possibilities of the chip technology.

According to one aspect of the present invention, the virtual path layer is the physical layer comprising the transmission sublayer and the physical medium sublayer, the cell layer and the application adaptation layer comprising the segmentation and reassembly sublayers and the functions for adapting the data formats to the corresponding application.

The main task is to establish the physical connection to other physical layers. This connection is basically bidirectional. Theoretically, this connection can be realised via a wide variety of media. In practice, two serial differential GBps connections are used. In this layer, the line coding, the insertion of empty cells to decouple the cell rate from the connection rate and the integration of the cell stream into the serial frame take place.

In the cell layer, the segmented data (cell payload data) of the segmentation & reassembly sub-layer above is assembled into complete cells with header, VP identifier and CRC or cells are CRC-checked and the payload is passed on to the segmentation and reassembly sub-layer. This is also where the multiplexing of the different cell streams of the application customisation functions or the distribution of the cell payloads to the application customisation functions according to the VP identifier takes place. (Feed-in/Feed-out)

According to one aspect of the present invention, multiplexing and demultiplexing of cell streams in repeaters and splitters (forwarding) also takes place in the cell layer.

According to one aspect of the present invention, the task of the application adaptation functions is to adapt the data of the application interfaces to the format of the user data field of the cell and to transmit control information to the opposite side or to transmit control information of the opposite side for the adaptation to be used (time generation, frame formation).

According to one aspect of the present invention, all virtual data paths are unidirectional, i.e. they start at an initiator and end at one or more targets. If virtual data paths logically belong together, e.g. HDCP for a video channel, and thus form a bidirectional data path, these paths should have the same VP identifiers.

The virtual data path begins with an initiator and ends with one or more targets. It is realised by the cell sublayer and executes the following functions on the virtual path:
Add/delete multiplexing
VP translation
Stream Data (Continuous Data Stream)

The stream data function combines the time domain crossing and the bit width conversion of data from the application interface to the N bits of the cell rows. The cell row payload is already preformatted so that the cell footer and header fit into the first and last cell row.

Streamed data is (normally) source-synchronised. The clock domain crossing of the data path from the application clock domain to the Virtual Path Layer clock domain is performed here.

A data buffer is provided in the transmission direction, into which the source-synchronised data is written with the source clock. The segmentation layer retrieves the data from this buffer as required in order to perform the data format conversion into the N-bit wide rows of the cells. Frame data (e.g.: Hsync, Vsync, DE) is encoded in payload info bits so that the frame can be reconstructed on the receiver side.

In the receive direction, the cell data from the reassembly sublayer is written to a data buffer, whereby the cell row bit width is (with cell row bit width). The frame information is reconstructed based on the payload info bits. The source clock is regenerated, for example, using buffer fill level and clock synthesis.

If data encryption is required (HDCP), the cell data is encrypted or decrypted in this function.

Due to the different types of streamed data, such as: Audio, video with and without encryption, there may be different implementations of this basic function (e.g.: VStream In/Out; AStream In/Out; Enc VStream In/Out).

The interface to the segmentation & reassembly sub-layer is the same for all functions.
Burst Data (Discontinuous Data Stream)

The burst data function combines the clock domain crossing and data bit wide conversion of data from the application interface to the N bits of the cell rows. The cell row payload is already preformatted so that the cell footer and header fit into the first and last cell row.

Burst data is (normally) synchronised to an external time and has different identification signals for direction and data type (address/data/ByteEnable).

This data is normally accompanied by control lines in order to realise a specific protocol.

A data buffer is provided in the transmission direction, into which the burst data is written with the interface clock. The segmentation layer retrieves the data from this buffer as required in order to perform the data format conversion into the N-bit wide row cells.

In the receive direction, the cell data from the reassembly sublayer is written to a data buffer, whereby the cell row is bit-wide. The interface control signals are reconstructed based on the payload info bits.

The payload info bits are used to generate the control signals of the application-specific interfaces or to synchronise the protocol state machines in the application-specific interfaces.

Due to the different interfaces that provide burst-like data (SPI, I2C, MII), there may be different implementations of this basic function (e.g.: SPIBurst, I2CBurst, MIIBurst).

Accordingly, there will also be (slightly) different stream in/out interfaces, although their structure should be the same.

The problem is also solved by a system arrangement in an automobile for generating an efficient transmittable bit sequence with a restricted disparity and a restricted run length, comprising an interface unit set up for providing any bit sequence; a segmentation unit set up for segmenting the provided bit sequence into a predefined sequence of segments according to a respective predefined bit length; and a coding arrangement set up for coding each segment into a respective sub-symbol, using a respective coding unit per segment from a plurality of coding units, wherein a first subset of coding units actively controls a sign of the disparity of the sub-symbol by inverting the disparity of the generated sub-symbol to equalise a disparity of a second subset of coding units, wherein a juxtaposition of the sub-symbols results in the efficiently transmittable bit sequence.

The task is also solved by a computer program product with control commands that implement the proposed method or operate the proposed device.

According to embodiments of the invention, it is particularly advantageous that the method can be used to operate the proposed devices and units. Furthermore, the proposed devices and units are suitable for carrying out embodiments of the method according to the invention. Thus, in each case the device implements structural features which are suitable for carrying out the corresponding method. However, the structural features can also be designed as process steps. The proposed method also provides steps for implementing the function of the structural features. In addition, physical components can also be provided virtually or virtualised.

BRIEF DESCRIPTION OF THE DRAWING

Further advantages, features and details of the invention are apparent from the following description, in which aspects of the invention are described in detail with reference to the drawings. The features mentioned in the claims and in the description may each be essential to the invention individually or in any combination. Likewise, the above-mentioned features and the features further described herein may be used individually or in any combination. Functionally similar or identical parts or components are sometimes provided with the same reference signs. The terms "left", "right", "top" and "bottom" used in the description of the embodiments refer to the drawings in an orientation with a normally legible figure designation or normally legible reference signs. The embodiments shown and described are not to be understood as conclusive, but are of an exemplary nature to explain the invention. The detailed description is for the information of the skilled person, therefore known circuits, structures and methods are not shown or explained in detail in the description, so as not to impede understanding of the present description. The figures show:

FIGS. 6A, 6B, 6C, 6D provide exemplary encodings of data segments to symbols such that the disparity is optimised according to an aspect of the present invention.

Some of these figures have parameters which are familiar to the skilled person in the English designation and which are used as parameters and cannot be translated in this way

DETAILED DESCRIPTION

Figure 1:
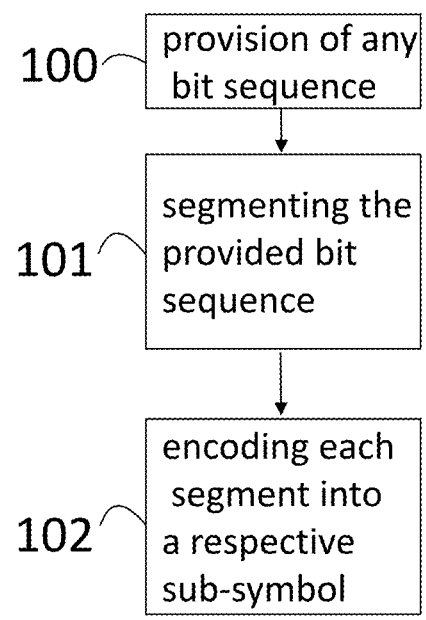
FIG. 1 provides a schematic flowchart of a method for generating an efficient transferable bit sequence with a restricted disparity and a restricted run length according to an aspect of the present invention.

FIG. 1 shows in a schematic flow chart a method in an automobile for generating an efficiently transferable bit sequence with a restricted disparity and a restricted run length, comprising providing 100 an arbitrary bit sequence; segmenting 101 the provided bit sequence into a predefined sequence of segments according to a predefined bit length in each case; and encoding 102 each segment into a respective subsymbol, using a respective encoding unit per segment from a plurality of encoding units, wherein a first subset of encoding units actively controls a sign of the disparity of the subsymbol by inverting the disparity of the generated subsymbol to equalise a disparity of a second subset of encoding units, wherein a juxtaposition of the subsymbols results in the efficiently transmittable bit sequence.

Figure 2:
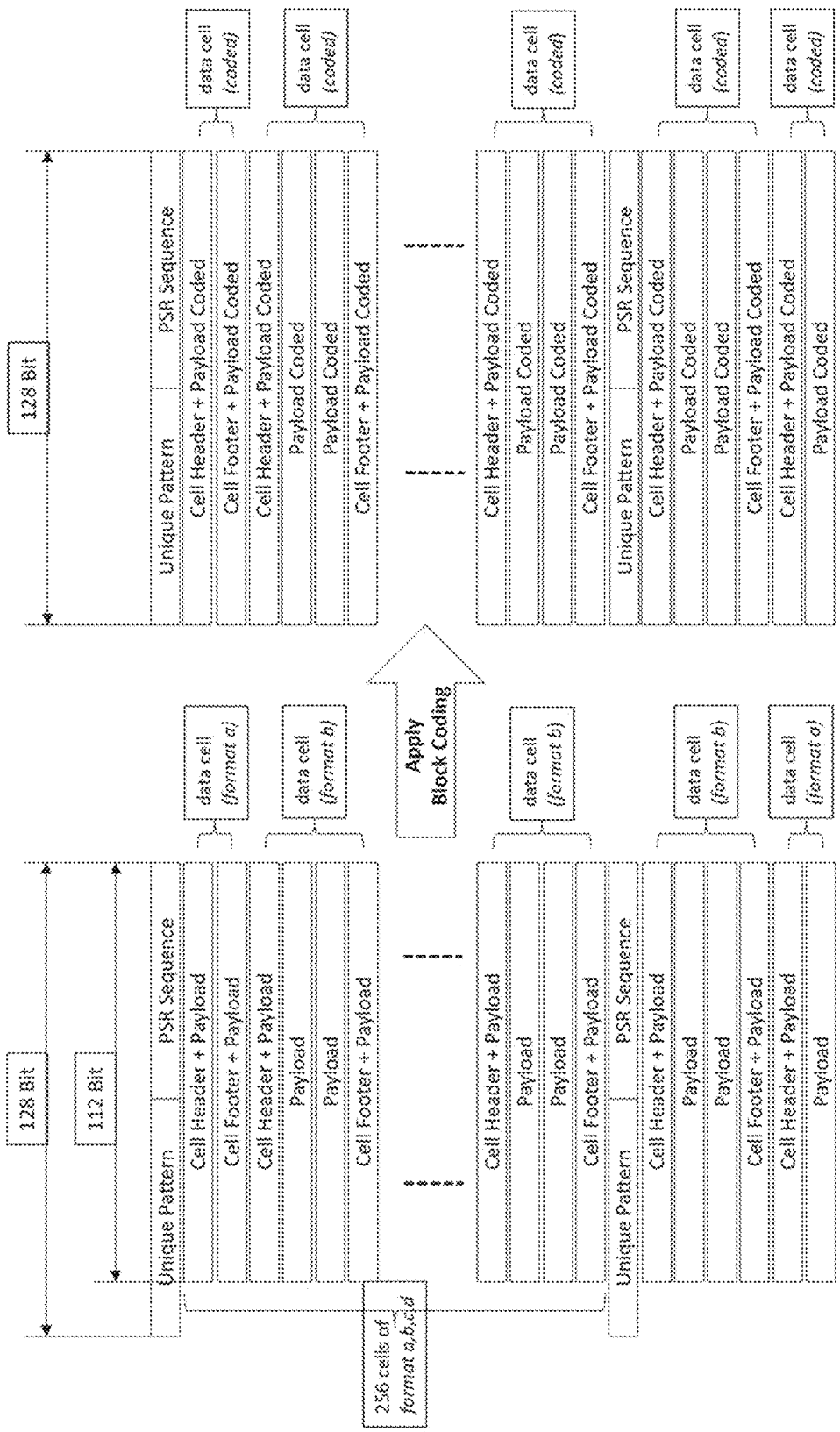
FIG. 2 provides a basic frame format and the application of a so-called block code according to one aspect of the present invention.

FIG. 2 shows a data format that displays an arbitrary bit sequence on the left-hand side and sub-symbols on the right-hand side. The data to be encoded has 112 bits and the sub-symbols have 128 bits. In this way, an arbitrary bit sequence of 112 bits is encoded to a total symbol of 128 bits. The coded 128 bits are optimised in terms of disparity. The arrow in the centre indicates that the coding units translate the data segments on the left-hand side into partial symbols on the right-hand side. The figure also shows that the method can be used multiple times, meaning that any number of bit sequences can be translated into any number of total symbols. In addition, the data can be divided into different data cells or data frames.

Even if the data on the left-hand side has the same semantic content as the data on the right-hand side, the data on the right-hand side is encoded in such a way that its disparity is optimised. In general, this method can be applied to any data, hence the arbitrary bit sequence, and both user data and header data can be transferred.

The data fields entered are to be understood merely as examples and form an application example of the present invention.

Figure 3:
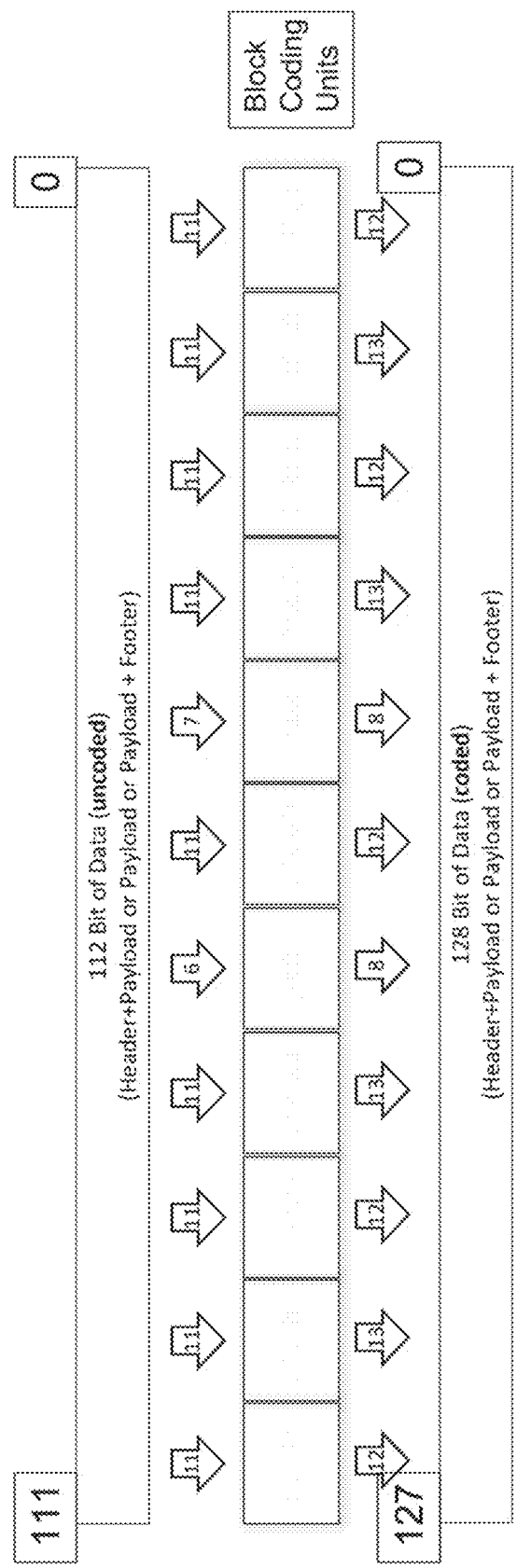
FIG. 3 provides a schematic diagram of an assembly and structure of the so-called block code according to a further aspect of the present invention.

FIG. 3 shows the coding units in the centre together with the inputs and outputs. The output data consists of 112 bits, which in this case have the index 0-111.

These are broken down into segments which have 11, 6, 7 or other bit length assignments. In this example, these segments are translated into sub-symbols of 12, 13, 8 or other data lengths. The proposed example is particularly advantageous because it encodes 112 bits into 128 bits, thereby achieving a particularly high degree of efficiency. The 128 bits have the same content as the bit sequence to be encoded and are only 16 bits longer.

The figure on the left shows that the arbitrary bit sequence of 112 bits is segmented into data segments of 11 bits and then encoded into 12 bits by means of the encoding unit 11B12B.

Figure 4:
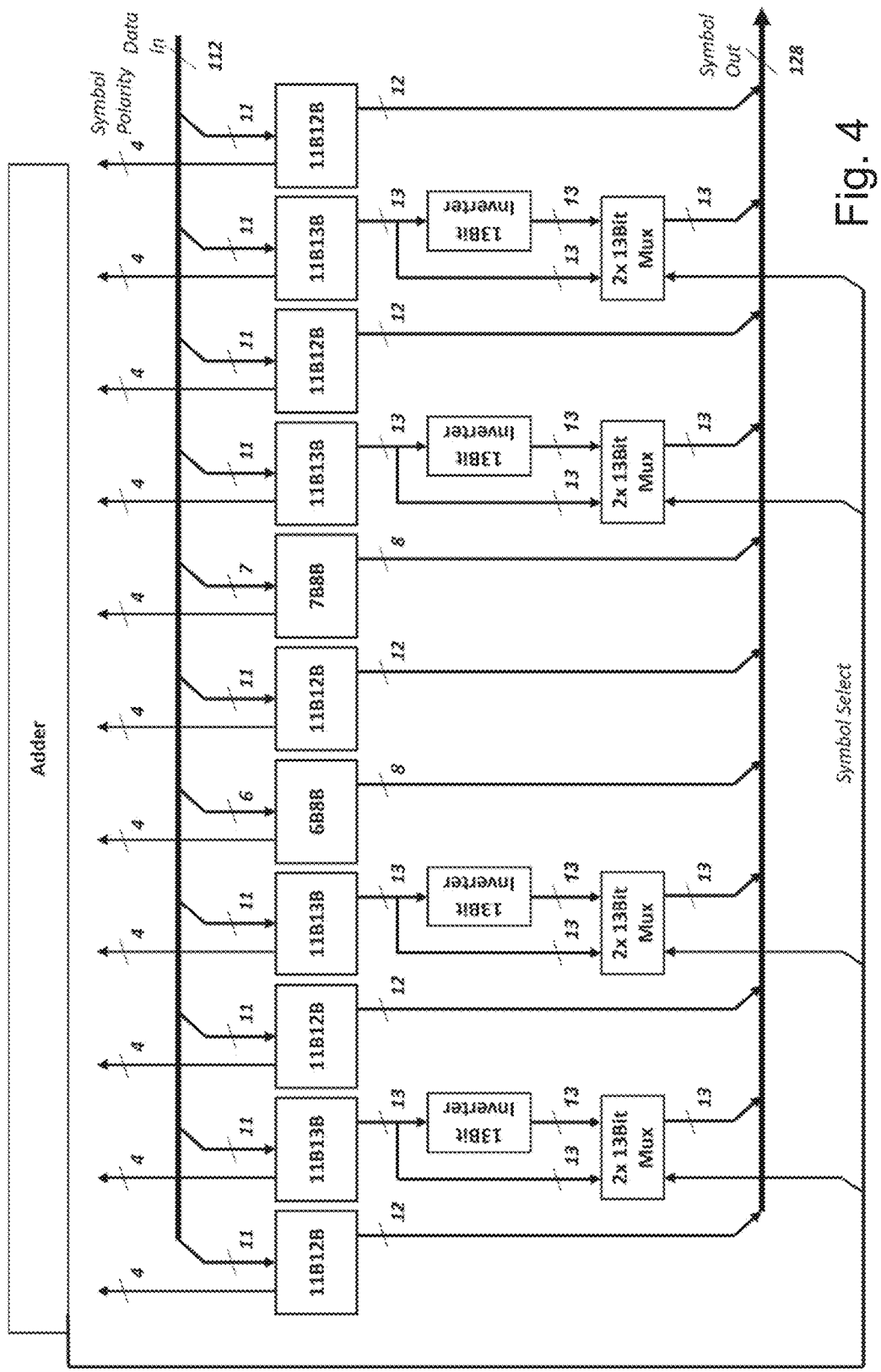
FIG. 4 provides a schematic block diagram of the system arrangement for generating an efficiently transferable bit sequence with a limited disparity and a limited run length according to a further aspect of the present invention.

FIG. 4 above shows the arbitrary bit sequence of 112 bits, which is segmented into 11, 6 or 7 bits. The coding units are then addressed in parallel, which convert the bits into sub-symbols in such a way that they are optimised in terms of disparity. For example, 11 bits are coded after 12 bits or 11 bits after 13 bits.

In this FIG. 4, a coding unit from the second subset is shown on the far left-hand side in the centre, which is labelled 11B12B. This provides a partial symbol with any sign, i.e. with any disparity. To compensate for this disparity, the coded unit 11B13B is connected downstream in parallel with respect to the bit sequence. This means that a data stream is formed which converts the most significant bits of two times 11 into two sub-symbols, namely once the 11-bit data segment is formed by 11B12B into a 12-bit sub-symbol with any sign, i.e. disparity, and once the data segment is encoded from 11 bits into 13 bits by means of the encoding unit 11B13B. In the figure below the coding units, the second coding unit from the left 11B13B is a coding unit of the first subset. This has an inverter and a multiplexer. The first 13 bits are therefore available as a data stream, which is divided in such a way that it is inverted once with regard to the sign, i.e. the disparity, and once remains unchanged. It is shown below that the positive or negative, i.e. the original or inverted data stream that equalises the sign from the leftmost coding unit is used under disparity feedback. There are therefore two data streams at the first multiplexer on the left, each of which represents the partial symbol, one with a conventional sign, i.e. as it is output from the 11-bit 13-bit coding unit, and one with an inverted sign or inverted disparity.

Based on the feedback from the unit at the top, the disparity resulting from the leftmost encoder 11B12B is thus determined and the multiplexer, at the bottom left, compensates for or minimises the disparity of the partial symbol of the leftmost encoder 11B12B. This is carried out in parallel in such a way that the coding units from the second subset are followed by coding units from the first subset, which minimise or eliminate the disparity. Finally, the total symbol is output at the bottom right. This total symbol has 128 bits and is composed of the sub-symbols as they are inserted into the bold line below using the slanted arrows. This output line therefore contains the partial symbols that are optimised or minimised in terms of disparity and these partial symbols form the entire symbol, which can then be output and transmitted.

According to one aspect of the present invention, the invention encodes a 112-bit wide data word, with any disparity (disparity max: 112) and any run length (run length max: 112), on a 128-bit wide symbol. Thus, the overhead resulting from the encoding is 14.2%.

The maximum run length occurring in the symbol, as well as with any sequencing of any symbols, is 8 identical bits.

The maximum disparity in the long mean is 0. The disparity in a symbol is less than 9.

The complexity of the logic is minimal, comparable with 10 8B/10B encoders (with the well-known disadvantage of the large overhead).

This is achieved by the use, or parallel use, of several "small" encoders that are optimally matched to each other in terms of their disparity and run length characteristics.

The encoders 11B12B, 7B8B and 6B8B generate all symbols with a guaranteed maximum run length of 6, even with any sequencing of the (partial) symbols.

According to one aspect of the present invention, the encoder (11B13B) generates symbols with a guaranteed maximum run length of 7 or at the beginning or end of the symbol of 5. Due to the sequencing (FIG. 2) of (11B13B) with the other encoders, a maximum run length of 8 can thus be generated in the symbol.

See properties of the encoders, as follows:

11B13B: 11-bit data is mapped to 2048 symbols with 13 bits. The symbols can be transmitted in inverted or non-inverted form.
  Disparity: +3 . . . +9 or controllable −3 . . . −9
  Running length in word: 7
  Running length at the edge: 5.

11B13B: 11-bit data is mapped to 2048 symbols with 13 bits. The symbols can be transmitted in inverted or non-inverted form.
  Disparity: +3 . . . +9 or controllable −3 . . . −9
  Running length in word: 7
  Running length at the edge: 5

11B12B: 11-bit data is mapped to 2048 symbols with 12 bits. The symbols are only transmitted non-inverted.
  Disparity: −2, −1, 0, 1, 2
  Running length in word: 6
  Running length at the edge: 3

7B8B: 7-bit data is mapped to 128 symbols with 8 bits. The symbols are only transmitted non-inverted.
  Disparity: −2, −1, 0, 1, 2
  Running length in word: 6
  Running length at the edge: 3

6B8B: 6-bit data is mapped to 64 symbols with 8 bits. The symbols are only transmitted non-inverted.
  Disparity: 0
  Running length in word: 6
  Running length at the edge: 3

With the four 11B13B encoders, a controllable disparity of at least +−12 can be generated in order to compensate for the non-controllable disparity of a maximum of +−12(6x+−2) of the 11B12B and 7B8B encoders, so that a balanced disparity can be reliably achieved regardless of the data to be transmitted.

In order to further reduce the complexity of the hardware, according to one aspect of the present invention, 4 small encoders (11B13B) are used, the disparity of which can be controlled with respect to sign (+−).

According to one aspect of the present invention, the symbol disparity is controlled in such a way that each encoder calculates the parity of "its" subsymbol. This is done with little effort, since the subsymbol has only a few bits.

With four of the eleven encoders, the sign of the disparity of the subsymbol can be actively controlled by inverting the generated subsymbol. For this purpose, the encoders (11B13B) have the special feature that their symbols generate a symbol with positive disparity (+3 . . . +9) for all input data. By inverting the partial symbol, a symbol with negative disparity (−3 . . . −9) is obtained.

This allows the disparity (−2, −1,0,1,2) of the sub-symbols of the other encoders (11B12B and 7B8B) to be compensated for. The encoder 6B8B generates symbols whose disparity is always 0. Then all (partial) parities of the encoders (11B12B and 7B8B) are added together and the result controls the decision as to how many inverted and non-inverted symbols of the encoder (11B13B) are used.

The minimum (smallest) disparity of the encoder is 11B13B+−3. In total, a disparity of +−12(4*+−3) per symbol can be compensated for with these four encoders.

Furthermore, five (11B12B) encoders and one (7B8B) encoder are used whose maximum disparity is +−2. So in the extreme case, these six encoders generate a disparity of exactly +−12(2*+−6). This can be safely compensated by the 11B13B encoder.

According to one aspect of the present invention, the method achieves the same quality as an 8B10B code but with half the overhead (loss due to encoding).

The implementation of the encoding and decoding hardware requires only minimal resources (logic) due to the use of several small encoders instead of one large one.

Coding can typically take place completely in one cycle of the parallel data path (no pipelining necessary).

The control of the disparity of the 128 bit symbol can be realised with (very) little logic, and can be realised completely within one clock of the data path (slow), instead of calculating the disparity by counting the one and zero bits in the serial data stream with the very fast serial clock.

Due to the deterministic disparity and run length, further scrambling is not necessary and therefore fast synchronisation to the data stream on the receiver side is possible (no scrambler synchronisation required).

Among other things, this is very useful for power save modes in which the link can be switched off to save energy and switched on again when required. Fast synchronisation between the transmitter and receiver is a must for this.

According to one aspect of the present invention, the invention encodes a 112-bit wide data word, with any disparity (disparity max: 112) and any run length (run length max: 112), on a 128-bit wide symbol. Thus, the overhead resulting from the encoding is 14.2%.

The maximum run length occurring in the symbol, as well as with any sequencing of any symbols, is 8 identical bits.

The maximum disparity in the long mean is 0. The disparity in a symbol is less than 9.

The complexity of the logic is minimal, comparable with 10 8B/10B encoders (with the well-known disadvantage of the large overhead).

This is achieved by the use, or parallel use, of several "small" encoders that are optimally matched to each other in terms of their disparity and run length characteristics.

The 11B12B, 7B8B and 6B8B encoders generate all symbols with a guaranteed maximum run length of 6, even if the (partial) symbols are sequenced in any order.

According to one aspect of the present invention, the encoder (11B13B) generates symbols with a guaranteed maximum run length of 7 or at the beginning or end of the symbol of 5. Due to the sequencing (FIG. 2) of (11B13B) with the other encoders, a maximum run length of 8 can thus be generated in the symbol.

See properties of the encoders as follows:

To further reduce the complexity of the hardware, four small encoders (11B13B) are used whose disparity can be controlled in terms of sign (+−).

According to one aspect of the present invention, the symbol disparity is controlled in such a way that each encoder calculates the parity of "its" subsymbol. This is done with little effort, since the subsymbol has only a few bits.

With four of the eleven encoders, the sign of the disparity of the subsymbol can be actively controlled by inverting the generated subsymbol. For this purpose, the encoders (11B13B) have the special feature that their symbols generate a symbol with positive disparity (+3 . . . +9) for all input data. By inverting the partial symbol, a symbol with negative disparity (−3 . . . −9) is obtained.

This allows the disparity (−2, −1,0,1,2) of the sub-symbols of the other encoders (11B12B and 7B8B) to be compensated for. The encoder 6B8B generates symbols whose disparity is always 0. Then all (partial) parities of the encoders (11B12B and 7B8B) are added together and the result controls the decision as to how many inverted and non-inverted symbols of the encoder (11B13B) are used.

The minimum (smallest) disparity of the encoder is 11B13B+−3. In total, a disparity of +−12(4*+−3) per symbol can be compensated for with these four encoders.

Furthermore, five (11B12B) encoders and one (7B8B) encoder are used whose maximum disparity is +−2. So in the extreme case, these six encoders generate a disparity of exactly +−12(2*+−6). This can be safely compensated by the 11B13B encoder.

The process achieves the same quality as an 8B10B code but with half the overhead (loss due to encoding).

The implementation of the encoding and decoding hardware requires only minimal resources (logic) due to the use of several small encoders instead of one large one.

Coding can typically take place completely in one cycle of the parallel data path (no pipelining necessary).

The control of the disparity of the 128 bit symbol can be realised with (very) little logic, and can be realised completely within one clock of the data path (slow), instead of calculating the disparity by counting the one and zero bits in the serial data stream with the very fast serial clock.

Due to the deterministic disparity and run length, further scrambling is not necessary and therefore fast synchronisation to the data stream is possible on the receiver side (no scrambler synchronisation required).

Among other things, this is very useful for power save modes in which the link can be switched off to save energy and switched on again when required. Fast synchronisation between the transmitter and receiver is a must for this.

Figure 5:
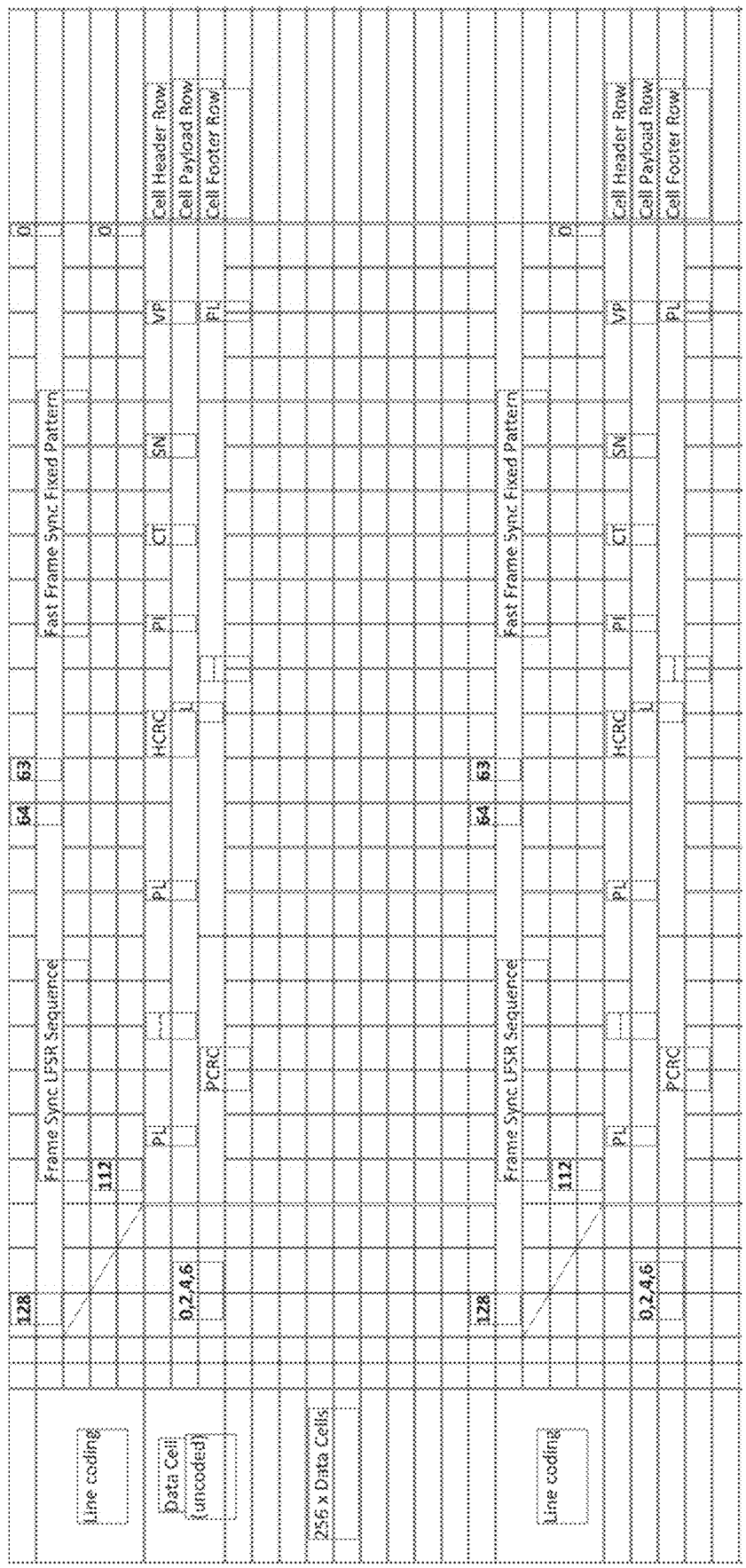
FIG. 5 provides a schematic diagram of a frame format as it may be used according to the invention.

FIG. 5 shows a data format that can be used in FIGS. 2, 3 and/or 4, for example. Again, the 128-bit total symbol and the arbitrary data sequence of 112 bits are shown. Overall, the arbitrary bit sequence and the total symbol can have different header data or frame data.

In the following, some concrete possibilities are created as to how segments of the arbitrary bit sequence can be translated into sub-symbols so that the disparity is minimised or eliminated. A first table shows a translation from 6 bits to 8 bits, a second table shows a translation from 7 bits to 8 bits, a third table shows a translation from 11 bits to 12 bits and a fourth table shows a translation from 11 bits to 13 bits. Segments of 6, 7 or 11 bits are thus converted into sub-symbols of 8, 12 or 13 bits. The encodings shown are exemplary and illustrate the technical effect that is achieved in the present case. Embodiments of the present invention have been empirically evaluated and, using the proposed encoding, achieves that 112 bits can be optimised with regard to their disparity in such a way that only 128 bits are required. This corresponds to a so-called overhead of only 14%.

In the present case, cells are used as a synonym for frames. These can also be packages.

Cell Format/Frame Format

According to one aspect of the present invention, the cell comprises a header with a fixed bit length, a payload area with 4 selectable bit lengths and a footer, again with a fixed bit length.

The cell structure is a sequence of bits as follows:
A 7-bit virtual path identifier (VP) that represents a unique address of the virtual path.
A 3-bit sequence number (SN) that numbers the cells consecutively in their sequence.
A 2-bit wide cell type (CT) identifier that specifies the length of the user data.
A 3-bit-wide payload information (PI) that contains additional information about the payload. This can also be used to synchronise payload data and frame data or control data.
A 10-bit wide CRC polynomial (HCRC) for error protection of the header information. The polynomial has a Hamming distance of 5 up to a bit sequence of 21 bits (P=0×2B9).
The payload (PL) range has a length of: 187, 411, 635 or 859 bits, depending on the CT value. The shortest payload is selected so that it is still larger than the largest supported (video) streaming bus width. (Should simplify the mapping of streaming data to the cell payload).
Finally, a 12-bit wide CRC polynomial (PCRC) for error protection of the user data. The polynomial has a Hamming distance of 4 up to a bit sequence of 2035 bits (P=0×8F3).

Format of the Transfer Frames

According to one aspect of the present invention, the transmission frame comprises a sequence of M-bit wide words. The frame starts with an M-bit wide "comma" word from a defined sequence of comma words for the frame alignment. This is followed by K cells. The cells consist of 2, 4, 6 or 8 N-bit wide words that carry the header, payload and footer. These N-bit wide words are coded into M-bit wide symbols (line coding).

This format is selected to enable cell data to be processed at appropriate time frequencies, provided that the serialiser/deserialiser always processes a block of M bits.

FIG. 6A shows a section of an exemplary coding of data segments to symbols, where 6 bits are coded to 8 bits in such a way that the disparity according to is optimised in one aspect of the present invention. For example, a Segment 000000 coded to a partial symbol 00101011, i.e. a 6B8B encoder.

Furthermore, FIG. 6B shows a 7B8B encoder, FIG. 6C shows an 11B12B encoder and FIG. 6C shows an 11B12B encoder.

FIG. 6D an 11B13B encoder.

What is claimed is:

1. A method in an automobile for generating an efficiently transferable bit sequence with a restricted disparity and a restricted run length, comprising:
   a provision (100) of any bit sequence;
   segmenting (101) the provided bit sequence into a predefined sequence of segments according to a predefined bit length;
   encoding (102) each segment into a respective sub-symbol, using one encoding unit per segment from a plurality of encoding units, wherein a first subset of coding units actively controls a sign of the disparity of the partial symbol by inverting the disparity of the generated partial symbol to compensate a disparity of a second subset of coding units in dependence on already transmitted total symbols, such that the disparity of all total symbols is minimised, wherein a juxtaposition of the partial symbols results in the efficiently transmittable bit sequence,
   wherein the disparity of the second subset of coding units is not controllable.

2. The method of claim 1, wherein the arbitrary bit sequence is unrestricted in its disparity and run length.

3. The method of claim 1, wherein the active control of the sign is carried out in each case by means of conditional bitwise inversion of the symbol.

4. The method of claim 1, wherein a conditional inversion takes place as a function of the disparity of an overall symbol, which is formed from all partial symbols.

5. The method of claim 4, wherein the dependence is influenced in such a way that a magnitude value of the disparity is minimised.

6. The method of claim 4, wherein the absolute value is minimised in such a way that in the case of a positive overall symbol disparity it is counteracted by a negative parity of the sub-symbols.

7. The method of claim 4, wherein the absolute value is minimised in such a way that, in the case of negative overall symbol disparity, it is counteracted by a positive parity of the sub-symbols.

8. The method of claim 1, wherein coding units of the first subset code segments of 11 bits to subsymbols of 13 bits.

9. The method of claim 1, wherein coding units of the first subset have a disparity between +3 and +9, which are specifically inverted to −3 to −9 by bitwise inversion of the partial symbol.

10. The method of claim 1, wherein a run length in partial symbols is a maximum of 6.

11. The method of claim 1, wherein a run length of the subsymbol in coding units of the first subset is at most 5, starting from the most significant and/or the least significant bit.

12. The method of claim 1, wherein in the case of coding units of the second subset, 11 bit segments are coded to 12 bit sub-symbols or 7 bit segments are coded to 8 bit sub-symbols or 6 bit segments are coded to 8 bit sub-symbols.

13. The method of claim 1, wherein a disparity between −2 and +2 is generated for coding units of the second subset.

14. The method of claim 1, wherein, in the case of coding units of the second subset, a run length is 6 in the generated partial symbol.

15. The method of claim 14, wherein coding units of the second subset generate partial symbols which have a maximum run length of 3 at the edge.

16. The method of claim 1, wherein the coding units are addressed in parallel and each code a segment into a partial symbol.

17. The method of claim 1, wherein the coding units are addressed in the sequence 21212221212, wherein a 1 stands for a coding unit of the first subset and a 2 stands for a coding unit of the second subset.

18. The method of claim 1, wherein a multiplexer selects the data stream which contributes to minimising the overall disparity of the overall symbol when a positive data stream and a negative data stream are present with respect to the disparity.

19. A system arrangement in an automobile for generating an efficiently transferable bit sequence with a restricted disparity and a restricted run length, comprising:
   an interface unit set up to provide (100) any bit sequence;
   a segmentation unit set up for segmenting (101) the bit sequence provided into a predefined sequence of segments according to a predefined bit length in each case;
   an encoding arrangement arranged to encode (102) each segment into a respective sub-symbol, using one encoding unit per segment from a plurality of encoding units, wherein a first subset of coding units actively controls a sign of the disparity of the partial symbol by inverting the disparity of the generated partial symbol to compensate for a disparity of a second subset of coding units depending on already transmitted total symbols, such that the disparity of all total symbols is minimised, wherein a juxtaposition of the partial symbols results in the efficiently transmittable bit sequence,
   wherein the disparity of the second subset of coding units is not controllable.

20. A computer program product comprising instructions which, when the program is executed by at least one computer, cause the computer to perform the steps of the method of claim 1.

21. A non-transitory computer-readable storage medium comprising instructions which, when executed by at least one computer, cause the computer to perform the steps of the method of claim 1.

* * * * *